United States Patent [19]
Greutert

[11] 4,374,026
[45] Feb. 15, 1983

[54] BASKET FILTER

[75] Inventor: Albert Greutert, Sachseln, Switzerland

[73] Assignee: Maxs AG, Switzerland

[21] Appl. No.: 255,204

[22] Filed: Apr. 20, 1981

[30] Foreign Application Priority Data

Apr. 30, 1980 [DE] Fed. Rep. of Germany ....... 3016729

[51] Int. Cl.³ ............................................. B01D 29/06
[52] U.S. Cl. ................................ 210/493.5; 210/497.2
[58] Field of Search ................... 210/484, 493.5, 497.2, 210/498, 499, 494.2

[56] References Cited
U.S. PATENT DOCUMENTS 2,641,365 6/1953 Lundeen ........................... 210/497.2

*Primary Examiner*—Ivars C. Cintins
*Attorney, Agent, or Firm*—Townsend and Townsend

[57] ABSTRACT

Disclosed is an improved basket filter which minimizes raw material waste and is formed of at least one rectangular perforated metal foil part folded along a bending line at its middle, transversely to its longitudinal edge, and at least two perforated metal foil elements in the form of sectors of a circle. The longitudinal edges of the rectangular metal foil part are connected to the straight line edges of the metal foil elements in the form of sectors of a circle so that, after assembly, the filter defines a round opening which merges into a straight line bottom edge. Adjoining edges between the rectangular metal foil part and the straight line edges of the metal foil elements are embedded in a plastic.

10 Claims, 5 Drawing Figures

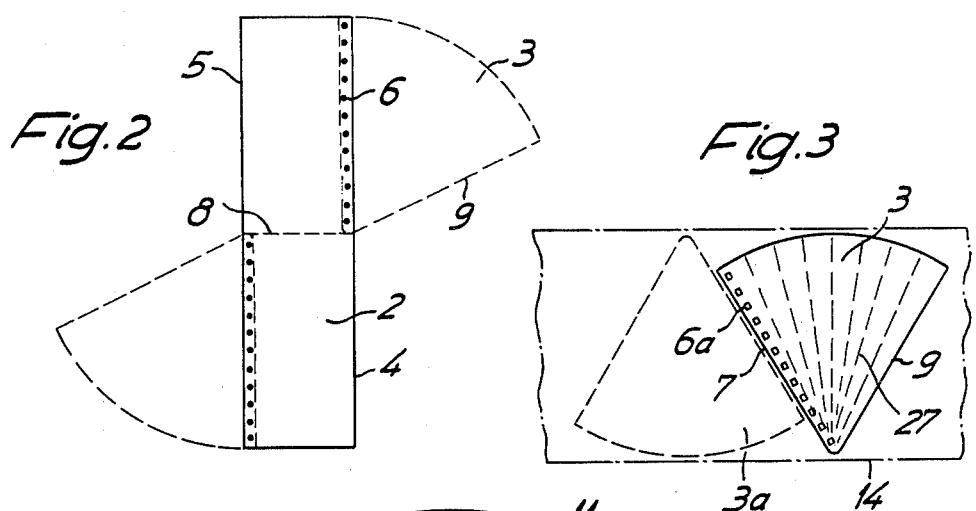
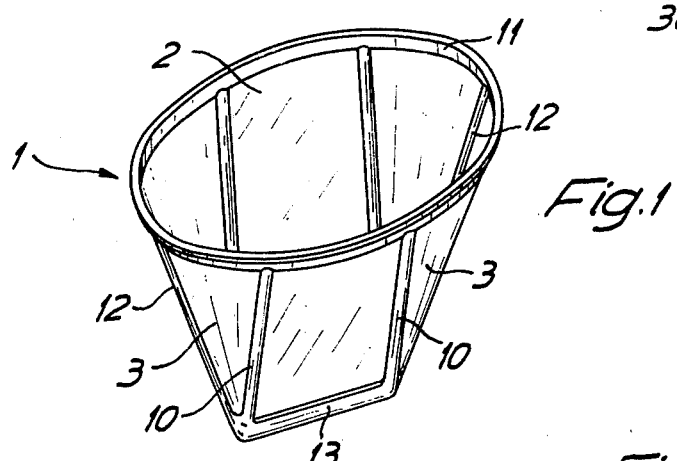
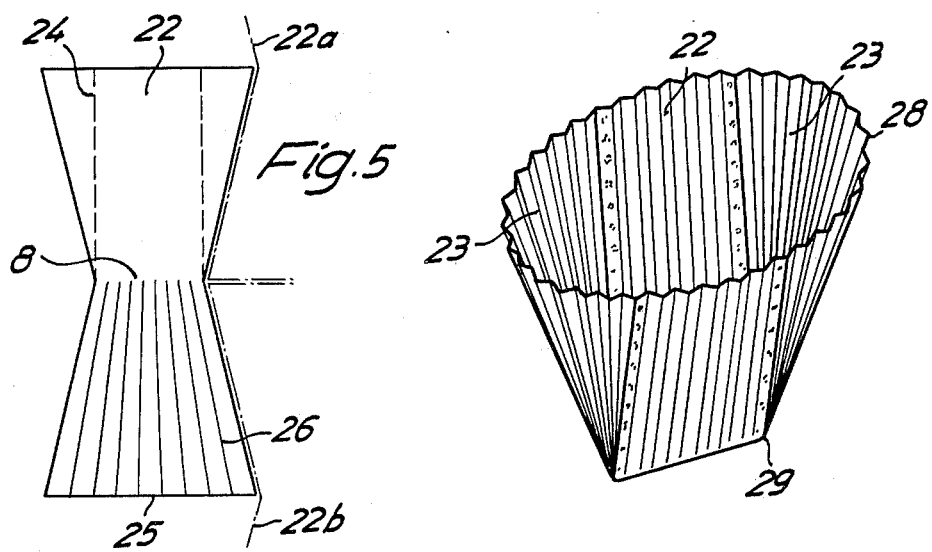

BASKET FILTER

BACKGROUND OF THE INVENTION

The invention relates to a basket filter made of perforated metal foil which is developable in one plane, with a form which merges from a round opening into a straight-line bottom edge, particularly for coffee-makers.

Conical basket filters are already known, in which the filter surface consists of a circular bottom part and a shell region in the form of a sector of a circular ring. Filters of this type have the disadvantage that a relatively large amount of waste occurs in the manufacturing of the individual metal foil parts. This is especially unfavourable in the galvanoplastic manufacture of the metal film parts and in gold-plating of these (German Offenlegungsschrift No. 2,217,341).

It is also known to manufacture basket filters of the type mentioned in the introduction from a onepiece metal foil part which has a butterfly-shaped outline. Even this design fails to ensure good utilisation of a metal foil.

SUMMARY OF THE INVENTION

The object of the invention is to provide a basket filter of the type mentioned in the introduction, in which less waste of metal foil occurs and which can, as a result, be manufactured at more favourable cost.

The achievement of this object is to be seen in the fact that the basket filter is constituted by at least one rectangular metal foil part and of at least two metal foil elements in the form of sectors of a circle, that the rectangular metal foil part is folded at an angle in the middle of and transversely to one longitudinal edge, and that the longitudinal edges of the rectangular metal foil part are connected to the straight-line edges of the metal foil elements in the form of sectors of a circle.

Preferably, the edges adjoining one another of the rectangular metal foil part and of the metal foil elements in the form of sectors of a circle are embedded in plastic ribs. In so doing, it is favourable if the metal foil elements in the form of sectors of a circle and the rectangular metal foil part are provided, on at least one of their forming longitudinal edges or straight-line edges, with connecting devices for the temporary connection of edge regions of these which adjoin one another. It is thereby guaranteed that the three parts of the basket filter are fixed relatively to one another, so that they can be placed into an injection mould without additional adjustment.

It is also favourable if the edges, forming the opening, of the rectangular metal foil part and of the metal foil elements in the form of sectors of a circle are embedded into a plastic bead. The rigidity of the basket filter is thereby increased.

An even greater increase in rigidity can be achieved if that bent region of the rectangular metal foil part which forms the bottom edge, and/or the rectangular metal foil part itself as well as the metal foil elements in the form of sectors of a circle are provided with plastic stiffening ribs.

A substantial increase in the stability of the actual filter surface is obtained if the rectangular metal foil part and/or the metal foil elements in the form of sectors of a circle are made corrugated.

The invention is further described below by means of two exemplary embodiments with reference to diagrammatic drawings.

BRIEF DESCRIPTION OF THE DRAWINGS

FIG. 1 shows a perspective view of a basket filter;

FIG. 2 shows a plan view of the rectangular metal foil part for the filter according to FIG. 1;

FIG. 3 shows a plan view of the metal foil element in the form of a sector of a circle for the filter according to FIG. 1;

FIG. 4 shows a modified embodiment of a basket filter in a perspective representation; and FIG. 5 shows a plan view of the rectangular metal foil part for the filter according to FIG. 4.

DETAILED DESCRIPTION OF THE DRAWINGS

The basket filter 1 illustrated in FIGS. 1 to 3 is constituted by a rectangular metal foil part 2 and two metal foil elements 3 in the form of sectors of a circle. The rectangular metal foil part 2 is provided, along one half of each of the longitudinal edges 4 and 5, with connecting devices 6 of a design known per se, which are illustrated in the form of dots and which serve to connect immovably to the metal foil part 2 the straight-line edge 7 of a metal foil element 3, said straight-line edge being provided with connecting devices 6a matching the latter, as indicated in FIG. 1 by the representation of the metal foil elements 3 in broken lines.

To manufacture the basket filter, the two metal foil elements in the form of sectors of a circle are first attached by means of the connecting devices to the rectangular metal foil part, and the latter is folded round a bending line 8 running transversely to a longitudinal edge 4, 5 and through the middle of this, and is placed into a suitable mould. In so doing, the straight edge 9 of each metal foil element 3 which is not provided with connecting devices approaches the longitudinal edge of the rectangular metal foil part 2, so that the two parts are already formed according to the final shape of the basket filter. Those edges of the metal foil part 2 and of the metal foil elements 3 which lie against one another or overlap one another are then embedded in plastic ribs 10 by means of an injection-moulding operation and are held together by these. Moreover, the margin forming the opening of the basket filter is embedded into a plastic bead 11, and the metal foil elements 3 are provided with additional strengthening ribs 12, as illustrated in FIG. 1. Finally, the bottom edge 13 which is formed by the region angled along the bending line 8 is surrounded by a plastic rib.

All the plastic ribs can be produced in one operation. Production processes of this type are known per se and do not constitute part of the invention.

FIGS. 4 and 5 show another embodiment of a basket filter, in which the rectangular metal foil part 22 and the two metal foil elements 23 in the form of sectors of a circle are made corrugated.

It will be seen from FIG. 5, which shows a plan view of the metal foil part 22, that the latter is only approximately rectangular, in order to guarantee that the metal foil part is rectangular after being embossed with corrugations, as indicated by the line 24.

Thus, the corrugated structure of the rectangular metal foil part 22 is such that, in the ready-corrugated part, the amplitude of the wave-form is largest at the short edges 25 and decreases uniformly to zero towards the bending line 8. The bending or folding lines 26 are indicated only in the lower part in FIG. 5.

In a similar way, each of the two metal foil elements 23 in the form of sectors of a circle is designed in such a way that the bending lines run along bending radii 27 (FIG. 3), so that the corrugation form is most pronounced at the arcuate margin 28 and decreases to zero towards the point 29.

The basket filter illustrated in FIG. 4 can, of course, be provided with strengthening and stiffening ribs in a similar way to the basket filter according to FIG. 1. It is distinguished by a large degree of stability and rigidity of the metal foil parts.

It will be seen from FIG. 5 that, despite the non-rectangular starting shape, there is no waste of metal foil for the rectangular metal foil part 22, since the individual metal foil parts 22, 22a, 22b lie against one another practically without gaps.

There is no great waste even in the manufacture of the metal foil elements in the form of sectors of a circle, since, according to FIG. 3, metal foil elements 3, 3a while lie against one another in opposite directions fit into a metal-foil path 14 which is illustrated by dot-and-dash lines.

It comes within the scope of the invention to compose the rectangular metal foil part and the metal foil elements in the form of sectors of a circle, in each case, of several, for example two parts. An even better utilisation of the area of the metal foil from which these parts are made can be achieved as a result.

I claim:

1. Basket filter made of perforated metal foil which is developable in one plane, with a form which merges from a round opening into a straight line bottom edge, comprising at least one rectangular metal foil part and at least two metal foil elements in the form of sectors of a circle, the rectangular metal foil part being folded at an angle in the middle of and transversely to its longitudinal edge to define the bottom edge, and the longitudinal edges of the rectangular metal foil part being connected to the straight line edges of the metal foil elements in the form of sectors of a circle.

2. The invention of claim 1 wherein the metal foil elements in the form of sectors of a circle and the rectangular metal foil part have, on at least one longitudinal edge, connecting devices to connect these parts to one another, said connecting edges being surrounded with plastic by injection-moulding.

3. The invention of claims 1 or 2, wherein top edges of the rectangular metal foil part and top edges of metal foil elements in the form of the sectors of a circle defining the opening are surrounded with plastic applied thereto by injection-moulding.

4. The invention of claim 1, wherein an angled region of the rectangular metal foil part which forms the bottom edge is surrounded with plastic applied thereto by injection-moulding.

5. The invention of, claim 1, wherein at least one of the rectangular metal foil part and the metal foil elements in the form of the sectors of a circle are provided with additional plastic stiffening ribs.

6. The invention of claim 1, wherein the rectangular metal foil part has a corrugated surface with bending lines which run transversely to the bottom edge.

7. The invention of claim 1, wherein the metal foil elements in the form of sectors of a circle have a corrugated surface with bending lines running radially.

8. The invention of claim 1, wherein the rectangular metal foil part is composed of two parts.

9. The invention of claim 1, wherein the rectangular metal foil part and the metal foil elements in the form of sectors of a circle are fastened to a plastic framework.

10. The invention of claim 1, wherein the rectangular metal foil part and the metal foil elements in the form of sectors of a circle are connected to one another by plastic webs.

* * * * *